(12) United States Patent
Hashimoto

(10) Patent No.: US 7,128,457 B2
(45) Date of Patent: Oct. 31, 2006

(54) SURFACE LIGHT-EMITTING DEVICE

(75) Inventor: Kazuyuki Hashimoto, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/514,418

(22) PCT Filed: Apr. 22, 2003

(86) PCT No.: PCT/US03/12310

§ 371 (c)(1),
(2), (4) Date: Aug. 2, 2005

(87) PCT Pub. No.: WO03/100481

PCT Pub. Date: Apr. 12, 2003

(65) Prior Publication Data

US 2006/0013015 A1    Jan. 19, 2006

(30) Foreign Application Priority Data

May 23, 2002  (JP) ............................. 2002-148622

(51) Int. Cl.
*F21V 8/00* (2006.01)
(52) U.S. Cl. .................... 362/618; 362/606; 362/607; 362/616; 362/620; 362/627; 362/628
(58) Field of Classification Search ................ 362/31, 362/26, 558, 582, 551, 552, 560, 600, 606, 362/607, 616, 618, 619, 620, 627, 628, 629
See application file for complete search history.

(56) References Cited

U.S. PATENT DOCUMENTS

| | | | |
|---|---|---|---|
| 4,460,940 A | 7/1984 | Mori | |
| 5,901,266 A * | 5/1999 | Whitehead | 385/133 |
| 6,679,613 B1 * | 1/2004 | Mabuchi | 362/600 |
| 6,927,891 B1 * | 8/2005 | Maheshwari | 359/291 |
| 2002/0024803 A1 | 2/2002 | Masaya | |

FOREIGN PATENT DOCUMENTS

| | | |
|---|---|---|
| JP | 1-45002 | 2/1989 |
| JP | 1-45003 | 2/1989 |

(Continued)

*Primary Examiner*—Laura K. Tso
(74) *Attorney, Agent, or Firm*—Stephen W. Buckingham

(57) ABSTRACT

There is provided a surface light-emitting device capable of preventing an increase in power consumption even if the length of the light-emitting surface of the surface light-emitting device is greater than the width, and capable of emitting light uniformly without decreasing the brightness of the light-emitting surface nor increasing the height of the light guiding space. In the present surface light-emitting device, the incident plane (201) is one of two sides of the light guiding space (20) in opposition in the longitudinal direction. The light-transmitting plate (4) includes a diffusion filter (6) which covers a specific area of the surface of the light-transmitting plate (4) near the light source (3). The remaining area of the surface of the light-transmitting plate at a distance from the light source (3) is not covered with the diffusion filter (6). The diffusion filter (6) is formed of a laminate in which a plurality of diffuse transmission films are layered. The number of diffuse transmission film (6) layers is highest in the area closest to the light source (3) so that the light transmittance is increased as the distance from the light source (3) increases due to a decrease in the diffusion of light, and the number is gradually decreased as the distance from the light source (3) increases.

5 Claims, 3 Drawing Sheets

FOREIGN PATENT DOCUMENTS

| | | |
|---|---|---|
| JP | 4-101639 | 4/1992 |
| JP | 5-224020 | 9/1993 |
| JP | 6-265892 | 9/1994 |
| JP | 7-5326 | 1/1995 |
| JP | 7-182908 | 7/1995 |
| JP | 2628858 | 4/1997 |
| JP | 10-82902 | 3/1998 |
| JP | 10-506725 | 6/1998 |
| JP | 11-142652 | 5/1999 |
| JP | 11-154406 | 5/1999 |
| JP | 2000-137105 | 5/2000 |

* cited by examiner

SURFACE LIGHT-EMITTING DEVICE

FIELD OF THE INVENTION

The present invention relates to a surface light-emitting device suitable for use in applications such as traffic signs, comparatively large back-lit type displays for displaying advertisements and the like, and planar illumination devices disposed on an indoor plane or outdoor plane of a building such as the ceiling, floor, and walls.

BACKGROUND OF THE INVENTION

Devices called surface light-emitting devices or sheet-type luminous bodies can emit light uniformly from the entire area of the light-emitting surface. Such devices are disclosed in the Published Japanese translation of PCT International Patent Application No. 10-506725, Japanese Patent Applications Laid-open No. 5-224020, No. 7-5326, No. 7-182908, No. 6-265892, No. 1-45003, No. 1-45002, No. 11-154406, No. 4-101639, and the like.

The sheet-type luminous bodies disclosed in these publications generally have the following structure. Specifically, these sheet-type luminous bodies include (1) a body which outlines a light guiding space and has at least one light-emitting surface, (2) a light source which is disposed outside the light guiding space of the body and supplies light to the light guiding space, and (3) a light unifying means which enables uniform brightness to be obtained over almost the entire area of the light-emitting surface when the light supplied to the light guiding space is emitted toward the outside of the body through the light-emitting surface. The body is in the shape of a box of which the sides other than the light-emitting surface are opaque, for example.

The light guiding space outlined by the body is almost in the shape of a rectangular parallelepiped having a specific length, width, and height. Generally, at least one of the sides having the largest area (for example, two sides having two sides parallel in the longitudinal direction and two sides parallel in the widthwise direction of the light guiding space) is an emission plane. The body includes a light-transmitting plate disposed to cover the emission plane. The surface of the light-transmitting plate is the light-emitting surface.

The light source is generally a line light source such as a fluorescent tube or a cold cathode tube. The light source emits light uniformly over the entire area of the circumferential surface and in the longitudinal direction. In the case of using the line light source, the line light source is generally disposed so that the line light source is parallel to both an incident plane and the light-emitting surface in order to cause the brightness of the light-emitting surface to become uniform. The line light source is generally disposed near at least one of four sides which intersect the emission plane (light-emitting surface) at right angles. In this case, the sides other than the incident plane and the emission plane are generally covered with side members formed of an opaque plate or sheet.

The brightness of the light-emitting surface is highest in the area close to the light source and decreases as the distance from the light source increases, whereby the light is emitted nonuniformly. Therefore, it is necessary to use the light unifying means so that uniform brightness is obtained over the entire area of the light-emitting surface. The light unifying means is a prism sheet or a white translucent diffuse transmission film as disclosed in the above publications. Combined use of this sheet and film is particularly effective. The light unifying means is disposed to substantially cover the entire area of the emission plane uniformly. For example, a diffuse transmission film is disposed on the surface of the light-transmitting plate and a prism sheet is disposed on the back face of the light-transmitting plate so that light supplied from the light source is transmitted through the prism sheet and the diffuse transmission film and emitted toward the outside. The prism sheet is generally formed of a transparent resin and has a prism surface on which a plurality of minute parallel prisms is formed.

As the line light source, a line light source including a side emitting type light fiber or a hollow light tube as an optical transmitter is also useful. The optical transmitter generally has a cylindrical circumferential surface (side). Light introduced into the optical transmitter from one tip of the optical transmitter in the longitudinal direction gradually leaks out from the circumferential surface as the light is transmitted toward the other tip in the longitudinal direction, whereby light is emitted brightly from the entire area of the circumferential surface. Japanese Patent Application Laid-open No. 11-142652 discloses an example in which the side emitting type light fiber is used as the line light source of the surface light-emitting device, for example. Japanese Patent No. 2628858 and Japanese Patent Applications Laid-open No. 10-82902 and No. 2000-137105 disclose line light sources using an optical transmitter consisting of a light tube formed by cylindrically rolling up a prism sheet. As disclosed in these publications, the light tube is generally formed so that the prism surface of the prism sheet faces the outside and the inner surface of the cylinder is formed by the flat surface of the prism sheet.

Applications of the surface light-emitting devices capable of emitting light uniformly by using the light source disposed outside of the body (edge lighting light source) and the light unifying means are limited to small light-emitting devices (backlight of a liquid crystal display for personal computers, for example). Specifically, since the area of the light-emitting surface is comparatively small (generally 80×80 cm or less), these surface light-emitting devices are unsuitable for use as comparatively large displays or planar illumination devices disposed on the indoor plane of the building and the like by forming a light-transmitting plate having a large area by horizontally arranging a plurality of light-transmitting plates, and emitting light from the surface of the large light-transmitting plate. The reasons therefor are as follows.

There is a tendency for the brightness of the light-emitting surface to be highest in the area close to the light source and to decrease as the distance from the light source increases. In the case where the area of the light-emitting surface is increased, in particular, in the case where the length of the light-emitting surface of the surface light-emitting device is greater than the width (the length of the light guiding space is greater than the width), the light unifying means disposed uniformly along the light-emitting surface is not effective for increasing the uniformity of brightness. For example, in the case where the light source is disposed near one of the edges of the light guiding space in the longitudinal direction, the distance between the incident plane and the side opposite to the incident plane in the longitudinal direction is increased. As a result, the difference in brightness tends to be increased between the area near the incident plane and the area near the side opposite to the incident plane. In order to eliminate unevenness of the brightness, diffusiveness of the diffuse transmission film must be increased as far as possible. However, this results in a decrease in light transmittance of the diffuse transmission film, whereby the brightness of the light-emitting surface is decreased. Increasing the height of the light guiding space (increasing the depth) is effective for uniformity of brightness. However, this results in an increase in the space occupied by the entire surface light-emitting device. In particular, in the case of emitting light from the indoor plane by incorporating the surface light-emitting device in a partition (floor, wall, or ceiling) of the building, since the depth (thickness) of the partition is limited, the height of the surface light-emitting device must be decreased as much as possible from the viewpoint of the design of the building.

Moreover, since the power consumption is increased by increasing the luminous brightness of the light source or the number of light sources in order to prevent a decrease in brightness, these measures are unfavorable from the viewpoint of energy saving and the like. In the case where the light source is disposed near one of the edges of the light guiding space in the widthwise direction, the distance between the incident plane and the side opposite to the incident plane becomes comparatively small, whereby the difference in brightness is decreased between the area near the incident plane and the area near the side opposite to the incident plane. In this case, a comparatively long line light source having the same length as the light guiding space is necessary. Since a large amount of electric power is needed to emit light brightly from such a light source, the power consumption tends to increase.

Accordingly, the present invention provides a surface light-emitting device capable of preventing an increase in power consumption even if the length of the light-emitting surface of the surface light-emitting device is greater than the width, and capable of emitting light uniformly without decreasing the brightness of the light-emitting surface nor increasing the height of the light guiding space.

SUMMARY OF THE INVENTION

The present invention provides a surface light-emitting device comprising a body defining a light guiding space generally in the shape of a rectangular parallelepiped having a specific length, width, and height, and a light source arranged outside the body to supply light to the light guiding space, wherein light supplied from the light source through an incident plane formed of at least one of the sides of the light guiding space can be emitted to the outside through an emission plane formed of the side which intersects the incident plane at right angles, the body includes a light-transmitting member disposed to cover the emission plane, the light-transmitting member includes a light-transmitting plate having a back face which faces the light guiding space and a surface opposing the back face, and a prism sheet disposed on the back face of the light-transmitting plate, the surface of the light-transmitting plate is a light-emitting surface, the incident plane is one of the opposing sides of the light guiding space in the longitudinal direction, the light-transmitting plate includes a diffusion filter which covers a specific area of the surface of the light-transmitting plate near the light source, the remaining area of the surface of the light-transmitting plate at a distance from the light source is not covered with the diffusion filter, the diffusion filter is formed of a laminate in which a plurality of diffuse transmission films is layered, and the number of diffuse transmission film layers is greatest in the area close to the light source and gradually decreases as the distance from the light source increases so that light transmittance is increased as the distance from the light source increases due to a decrease in diffusion of light.

Preferably, in the surface light-emitting device of the present invention, the light-transmitting plate includes a plurality of block light-transmitting plates arranged horizontally along the longitudinal direction of the light guiding space so that the edges of the block light-transmitting plates are in contact with one another, the diffusion filter covers substantially the entire area of the surfaces of a specific number of the block light-transmitting plates present near the light source, the diffusion filter does not cover the surfaces of the remaining block light-transmitting plates present at a distance from the light source, and the number of diffuse transmission film layers is greatest on the block light-transmitting plate close to the light source and gradually decreases as the distance from the light source increases.

The borderlines between the block light-transmitting plates preferably correspond to the edges of the layered diffuse transmission films. The light-transmitting member preferably consists of an assembly of block light-transmitting members, each of which includes the block light-transmitting plate. The prism sheet preferably consists of an assembly of divided pieces of prism sheets. The divided pieces of the prism sheets are preferably disposed on the block light-transmitting plates to form the block light-transmitting members.

In the surface light-emitting device of the present invention, the body is preferably formed of an assembly of body units, each of which includes one of the block light-transmitting members and is in almost the shape of a rectangular parallelepiped. Each of the body units preferably has a block space therein. A plurality of block spaces is preferably optically connected to form the light guiding space.

DETAILED DESCRIPTION

Figure 1:
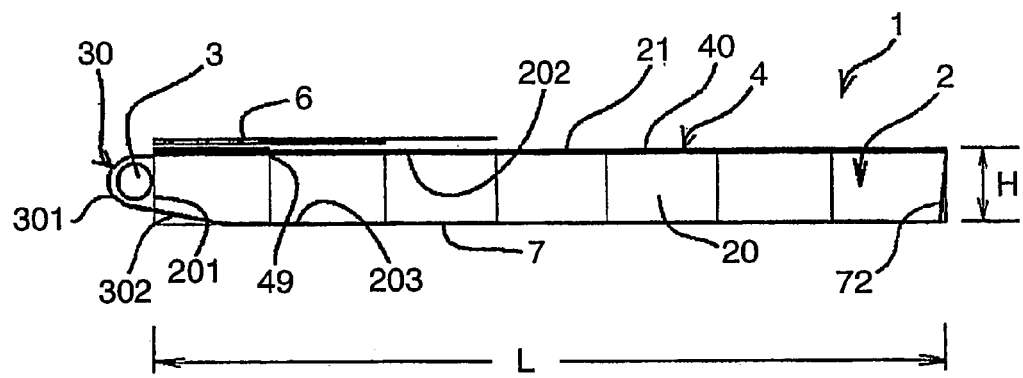
FIG. 1 is a cross-sectional view showing an example of a preferred embodiment of a surface light-emitting device according to the present invention, parallel to the directions of the length and the height of a body.

In the surface light-emitting device of the present invention, the diffusion filter formed of a laminate, in which a plurality of diffuse transmission films is layered, is disposed only in a specific area near the light source so that light transmittance is increased as the distance from the light source increases due to a decrease in diffusion of light. Specifically, the light-transmitting plate has the diffusion filter which covers the specific area of the surface of the light-transmitting plate near the light source. The remaining area of the surface of the light-transmitting plate at a distance from the light source is not covered with the diffusion filter. The number of diffuse transmission film layers is greatest in the area close to the light source and is gradually decreased as the distance from the light source increases so that light transmittance is increased as the distance from the light source increases due to a decrease in diffusion of light. This ensures that the uniformity of surface emission of light can be increased in a comparatively large area from the area near the light source to the area at a distance from the light source without decreasing the brightness of the light-emitting surface nor increasing the height of the light guiding space.

In the surface light-emitting device of the present invention, since the diffusion filter is not disposed on the surface of the light-transmitting plate in the area at a distance from the light source, a decrease in the brightness of the light-emitting surface can be effectively prevented. Moreover, since a plurality of diffuse transmission films is layered, an unnecessary increase in the amount of light leaking outside from the area close to the light source can be prevented without decreasing the uniformity of emission of light in the area close to the light source by effectively utilizing diffusion transmission effects of the films.

In the case where the diffuse transmission film is disposed only in the area close to the light source, the amount of light leaking to the outside from the area near the light source is unnecessarily increased and the brightness in this area is increased excessively. As a result, light supplied from the light source does not reach the area at a distance from the light source, whereby the brightness tends to be decreased in the area at a distance from the light source. In the case where the diffuse transmission film is disposed uniformly in a specific area comparatively close to the light source including the closest area, the brightness of the area in which the diffuse transmission film is disposed tends to be decreased. Therefore, uniformity of emission of light cannot be increased effectively in either case.

Therefore, in order to increase the uniformity of emission of light, the diffusion filter is formed so that the light transmittance is gradually increased as the distance from the light source increases due to a decrease in the diffusion of light. In order to cause the optical characteristics to be gradually changed in this manner, the diffusion filter of the present invention is formed of a laminate in which a plurality of diffuse transmission films is layered. The number of diffuse transmission films layers is greatest in a specific area close to the light source and gradually decreases as the distance from the light source increases.

The incident plane is one of two opposing sides of the light guiding space in the longitudinal direction. Therefore, it is unnecessary to allow the length of the light source to be the same as the length of the light guiding space even if the length of the light-emitting surface of the surface light-emitting device is greater than the width (the length of the light guiding space is greater than the width), whereby an increase in power consumption can be prevented.

Preferably, the visible light transmittance of the diffusion filter is 5% or more in the area in which the number of diffuse transmission film layers is greatest, and 60% or less in the area in which the number of diffuse transmission film layers is one. If the visible light transmittance is less than 5%, uniformity of emission of light may be decreased because the brightness is decreased in the area close to the light source. If the visible light transmittance exceeds 60% in the area in which the number of diffuse transmission film layers is one, uniformity of emission of light may decrease due an increase in the brightness in the area in which the number of diffuse transmission film layers is comparatively small. Therefore, the visible light transmittance of the diffusion filter is particularly preferably 6% or more in the area in which the number of diffuse transmission film layers is greatest, and 50% or less in the area in which the number of diffuse transmission film layers is one.

The visible light transmittance used in the present specification is light transmittance in the visible light region (wavelength region: 430–640 nm) measured using a spectrophotometer. The visible light reflectance is light reflectance in the visible light region measured using a spectrophotometer. Specifically, a case where the measured value for the visible light transmittance or reflectance is a specific value or more (or a specific value or less, or less than a specific value) means that the measured value in the entire wavelength region (generally determined from the spectrum distribution) is a specific value or more (or a specific value or less, or less than a specific value).

Surface Light-Emitting Device

Figure 2:
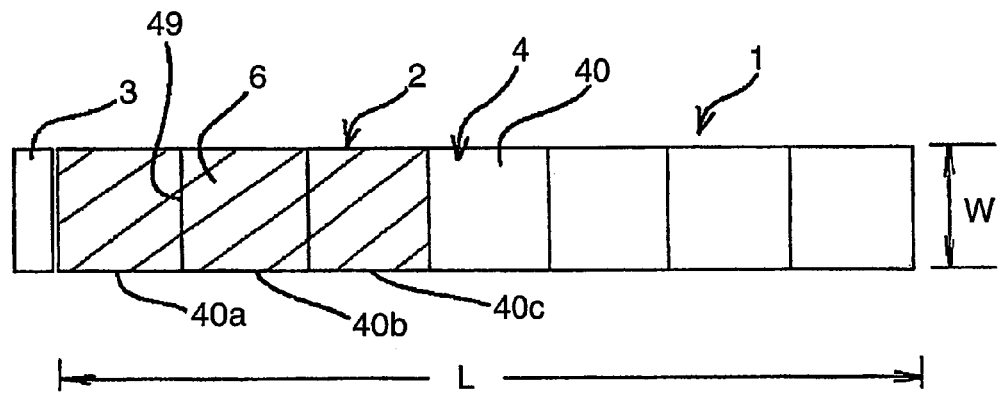
FIG. 2 is a plan view showing the surface light-emitting device shown in FIG. 1 viewed from the top of a light-emitting surface.

A preferred embodiment of the present invention is described below with reference to the drawings. FIG. 1 schematically shows a surface light-emitting device (1) of the present invention. FIG. 1 is a cross-sectional view parallel to the directions of the length and the height of a body. FIG. 2 is a plan view of the surface light-emitting device (1) shown in FIG. 1 viewed from the top of a light-emitting surface. In FIG. 2, a reflective plate (30) shown in FIG. 1 which covers a light source (3) is omitted so that the light source (3) is exposed. Details of the reflective plate (30) are described later.

The surface light-emitting device of the present invention has a specific length (L), width (W), and height (H), and includes a light guiding space (20) almost in the shape of a rectangular parallelepiped enclosed by the six sides. The surface light-emitting device (1) includes a body (2) which outlines the light guiding space (20), and the light source (3) which is disposed outside the body (2) and supplies light to the light guiding space (20), as shown in the figures. Light supplied from the light source (3) through an incident plane (201) formed of the side of the light guiding space (20) is emitted toward the outside through an emission plane (202) which is the side intersecting the incident plane (201) at right angles. The light source (3) shown in the figure is a line light source having a length approximately the same as the width (W) of the light guiding space. The line light source is disposed so as to be almost parallel to the emission plane (202) and the incident plane (201) in order to ensure that the brightness of the light-emitting surface is uniform.

Figure 3:
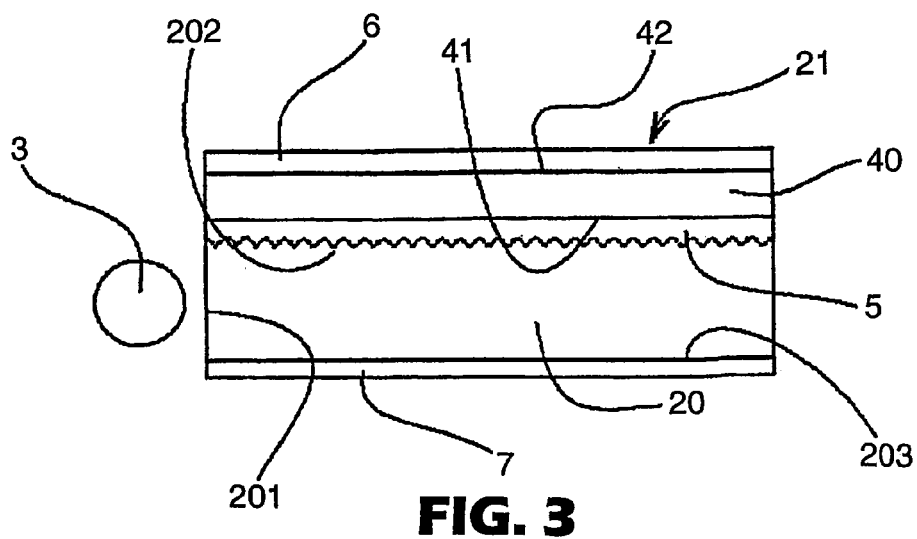
FIG. 3 is an enlarged cross-sectional view showing an area close to a light source shown in FIG. 1.

The body (2) includes a light-transmitting member (21) disposed to cover the emission plane (202). The light-transmitting member (21) used in the device shown in FIG. 1 includes a light-transmitting plate (4) having a back face (41) which faces the light guiding space (20) and a surface (42) opposing the back face (41), and a prism sheet (5) disposed so as to be in contact with the back face (41) of the light-transmitting plate (4), as shown in FIG. 3. In this device, the surface (42) of the light-transmitting plate is a light-emitting surface. FIG. 3 is an enlarged cross-sectional view showing the area close to the light source (3). In FIG. 3, the reflective plate (30) which covers the light source (3) is omitted so that the light source (3) is exposed.

The light-transmitting plate (4) may be either a transparent plate or a diffuse transmission plate insofar as the light-transmitting plate (4) transmits light. The light-transmitting plate (4) may be colored. The light-transmitting plate (4) is generally formed using a transparent material such as glass or plastic. A diffuse transmission light-transmitting plate may be formed by combining a plate formed of a transparent material and a diffuse transmission layer. The diffuse transmission layer is generally formed by dispersing inorganic pigments or polymer particles in a layer formed of a transparent material such as a polymer. The diffuse transmission translucent layer may be formed by molding a mixture in which inorganic pigments or polymer particles are dispersed in a transparent material in the shape of a plate. The visible light transmittance of the light-transmitting plate is usually 60% or more, and preferably 70% or more. The thickness of the light-transmitting plate (4) is appropriately determined without specific limitations depending upon the application of the surface light-emitting device. The thickness of the light-transmitting plate (4) is usually 3–20 mm. Details of the prism sheet are described later.

The incident plane (201) is one of two sides of the light guiding space (20) in opposition in the longitudinal direction. The light-transmitting plate (4) includes a diffusion filter (6) which covers a specific area of the surface of the light-transmitting plate (4) near the light source (3) (are indicated by slanting lines in FIG. 2). The remaining area of the surface of the light-transmitting plate at a distance from the light source (3) (the area without slanting lines in FIG. 2) is not covered with the diffusion filter (6). The diffusion filter is generally bonded to the surface of the light-transmitting plate through an adhesive such as a pressure sensitive adhesive. The diffusion filter (6) is formed of a laminate in which a plurality of diffuse transmission films is layered. A diffuse transmission film is a plastic film of which the surface is roughened or a film formed of a resin in which inorganic pigments or polymer particles are dispersed. As examples of the inorganic pigments, white inorganic powder can be given.

The diffusion filter (6) in the example shown in the figure is formed of a laminate in which three sheets of diffuse transmission films are layered. The number of diffuse transmission film layers is three in the area close to the light source and is gradually decreased to one as the distance from the light source increases so that the light transmittance is increased as the distance from the light source increases due to a decrease in the diffusion of light. The diffuse transmission films are generally bonded and layered through an adhesive such as a pressure sensitive adhesive. It is preferable that the optical characteristics of the diffusion filter used in the present invention be gradually changed with ease. Therefore, it is preferable that the maximum number of diffuse transmission film layers to be layered is three to five.

A transparent film may be caused to adhere to the surface of the light-transmitting plate in the area in which the diffusion filter is not disposed. The diffusion filter generally does not have a thickness by which the appearance of the light-emitting surface is impaired. However, a transparent film having the same thickness as the diffusion filter may be disposed to eliminate a step between the area in which the diffusion filter is disposed and the area in which the diffusion filter is not disposed (difference in thickness for the thickness of the diffusion filter). In this case, a transparent film may be disposed in the area in which the number of diffuse transmission film layers is small. The visible light transmittance of the transparent film is usually 80% or more, and preferably 90% or more.

In the example shown in the figure, the light-transmitting plate (4) consists of a plurality of block light-transmitting plates (40) arranged in the longitudinal direction of the light guiding space (20) so that the edges are in contact with each other. The diffusion filter (6) covers substantially the entire area of the surfaces of a specific number of block light-transmitting plates (three in the figure) near the light source (3), but does not cover the remaining block light-transmitting plates (four in the figure) at a distance from the light source. The number of diffuse transmission film layers is decreased as the distance from the light source increases. Specifically, the number of diffuse transmission film layers is three on a block light-transmitting plate (40a) close to the light source, two on the block light-transmitting plate (40b) adjacent thereto, and one on the third block light-transmitting plate (40c) from the light source.

In the case where the diffusion filter in which a plurality of diffuse transmission films is layered so that the light transmittance is gradually increased in the longitudinal direction is disposed only in the area near the light source, the amount of light leaking to the outside from the area close to the light source can be controlled appropriately, whereby an excessive increase in the brightness in this area can be prevented. Therefore, a decrease in the brightness in the area at a distance from the light source can be effectively prevented, whereby the uniformity of surface emission of light can be increased.

The area in which the diffusion filter is, disposed is generally determined so that the ratio of the maximum value (B) of the brightness of the light-emitting surface to the minimum value (D) (brightness ratio=B/D) is 4 or less. The brightness ratio is preferably 3.5 or less, and particularly preferably 3 or less. The brightness ratio may be effectively decreased by controlling the visible light transmittance of the diffuse transmission films.

In the surface light-emitting device of the present invention, uniformity of brightness can be adjusted by disposing the diffusion filter on the surface of the light-transmitting plate. Specifically, the area in which the diffusion filter is disposed may be determined so that the optimum brightness ratio is obtained by assembling the surface light-emitting device in which the diffusion filter is not disposed at a site at which the device is installed, and measuring the brightness distribution by causing surface emission to occur. Therefore, a device having a comparatively large light-emitting surface can be easily assembled. Therefore, workability can be improved remarkably in comparison with the case of disposing a light unifying means in the light guiding space. As examples of the light unifying means disposed in the light guiding space, a plurality of light diffusing dots of which the degree of diffusion is changed from near the light source in the longitudinal direction on the bottom of the light guiding space parallel to the light-emitting surface can be given.

The diffusion filter (6) is generally formed by attaching and layering a plurality of diffuse transmission films having different lengths while aligning one of the edges in the longitudinal direction so that the number of layers decreases toward the other edges in the longitudinal direction. This is described below according to the example shown in the figure. A first diffuse transmission film having a length equivalent to one piece of block light-transmitting plate is attached to the surface of the block light-transmitting plate (40a) close to the light source (3). A second diffuse transmission film having a length equivalent to two pieces of block light-transmitting plates is attached to the first diffuse transmission film and the block light-transmitting plate (40b). A third diffuse transmission film having a length equivalent to three pieces of block light-transmitting plates is attached to the first and second diffuse transmission films and the block light-transmitting plate (40c). This enables the number of diffuse transmission film layers to be three on the block light-transmitting plate (40a) close to the light source, two on the block light-transmitting plate (40b), and one on the block light-transmitting plate (40c). Therefore, the other edges of the first and second diffuse transmission films in the longitudinal direction are covered with the longest third diffuse transmission film and are not exposed. Because of this, a problem in which the diffuse transmission films are removed due to external force applied to the edges of the diffuse transmission films during use can be effectively prevented.

In the example shown in the figure, borderlines (49) between the block light-transmitting plates correspond to the edges of the diffuse transmission films (for example, an edge between the area in which only one sheet of film is present and the area in which two sheets of films are layered). The borderlines (49) between the block light-transmitting plates are present regularly on the entire light-emitting surface. On the contrary, the edges of the diffuse transmission films are not present in the area at a distance from the light source. Therefore, appearance of the light-emitting surface may be impaired due to conspicuousness of the edges of the diffuse transmission films. Conspicuousness of the edges of the diffuse transmission films can be eliminated by causing the borderlines (49) between the block light-transmitting plates to correspond to the edges of the translucent films.

The borderlines (49) between the block light-transmitting plates are generally sealed with a resin material such as putty, a sealing material, or an adhesive.

As shown in FIG. 1, it is preferable to dispose the reflective plate (30) having a curved reflecting surface (301) near the light source (3). This enables the emission direction to be effectively controlled so that substantially the entire amount of light from the light source (3) is directed to the guiding space (20). The reflective plate (30) is formed by processing a specular reflective material so as to have the reflecting area (301) in the shape of the letter "U" in cross section. The reflective plate (30) may include an area (302) extending from one of the edges of the U-shaped area (301). The extended area (302) may be introduced into the light guiding space (20) so that the reflecting surface faces the light-transmitting member (21). This decreases the amount of incident light parallel to the normal line of the prism surface of the prism sheet of the light-transmitting member (21) located near the light source (3), whereby leakage of an unnecessarily large amount of light from the light-transmitting member (21) can be prevented. Therefore, the amount of light reaching the area at a distance from the light source is effectively increased, whereby the uniformity of brightness of the light-emitting surface can be easily increased. The reflective plate (30) is preferably a parabolic mirror having a parabola section.

As the specular reflective material, a metal plate, metal foil, metal deposited film, dielectric reflective film, and the like may be used. The visible light transmittance of the specular reflective material is usually 80% or more, preferably 90% or more, and particularly preferably 95% or more.

Body

The length of the light guiding space of the body is preferably increased to such an extent that the brightness of the light-emitting surface at a distance from the incident plane is not decreased. The length of the light guiding space is usually 3–15 m, preferably 4–12 m, and particularly preferably 5–10 m. If the length of the light guiding space is too small, a large number of surface light-emitting devices are necessary when forming a planar illumination device using a plurality of surface light-emitting devices. This is disadvantageous for increasing the area of the light-emitting surface of the planar illumination device. On the contrary, if the length of the light guiding space is too great, the brightness of the light-emitting surface at a distance from the incident plane is decreased, whereby the uniformity of brightness of the light-emitting surface may be decreased.

The height of the light guiding space is preferably decreased to such an extent that the uniformity of brightness of the light-emitting surface is not decreased. The height of the light guiding space is usually 20–70 cm, preferably 30–65 cm, and particularly preferably 35–60 cm. If the height of the light guiding space is too small, the brightness of the light-emitting surface near the light source is unnecessarily increased, whereby the uniformity of brightness of the light-emitting surface may be decreased. On the contrary, if the height of the light guiding space is too great, the area occupied by the surface light-emitting device is increased. This is disadvantageous for emitting light from the indoor plane by embedding the surface light-emitting device in the partition of the building.

The width of the light guiding space is usually 20–100 cm, and preferably 30–90 cm. If the width of the light guiding space is too small, it is disadvantageous for forming a planar illumination device having a large light-emitting surface by arranging a plurality of bodies. On the contrary, if the width of the light guiding space is too great, it may become difficult to manufacture the body.

The emission plane of the light guiding space is covered with the light-transmitting member, as described above. Therefore, the light-transmitting member is disposed on the body in the area which becomes the light-emitting surface. The incident plane is allowed to remain as an opening or covered with a transparent member. The transparent member is a transparent plate or a transparent sheet formed of transparent glass, plastics, or the like.

The sides of the body other than the incident plane and the emission plane are generally covered with an opaque member. The opaque member is an opaque plate or an opaque sheet formed of opaque plastic, wood, metal, or the like. The inner surface of the opaque member facing the light guiding space is preferably covered with a reflective material. The reflective material is preferably a diffuse reflective material or a specular reflective material.

A bottom (203) parallel to the emission plane is preferably covered with the specular reflective material (7), as shown in FIG. 1. This is because the brightness of the light-emitting surface can be increased without decreasing the uniformity of emission of light. A prism sheet may be disposed in place of the specular reflective material (7). In this case, the longitudinal direction of the parallel prisms of the prism sheet is preferably parallel to the longitudinal direction of the light guiding space. The specular reflective material and the prism sheet may be used in combination. For example, either the specular reflective material or the prism sheet may be disposed on the bottom (203) in the area close to the light source in the longitudinal direction, and the other may be disposed in the area at a distance from the light source. The prism sheet may be layered on the specular reflective material so that the prism sheet faces the light guiding space. Part of the bottom (203) close to the light source may be covered with a black light absorber providing the effects of the present invention are not impaired. This decreases the amount of light which is reflected by the bottom (203) and reaches the light-emitting surface close to the light source, whereby the amount of light leaking out from the light-emitting surface is not unnecessarily increased.

Figure 4:
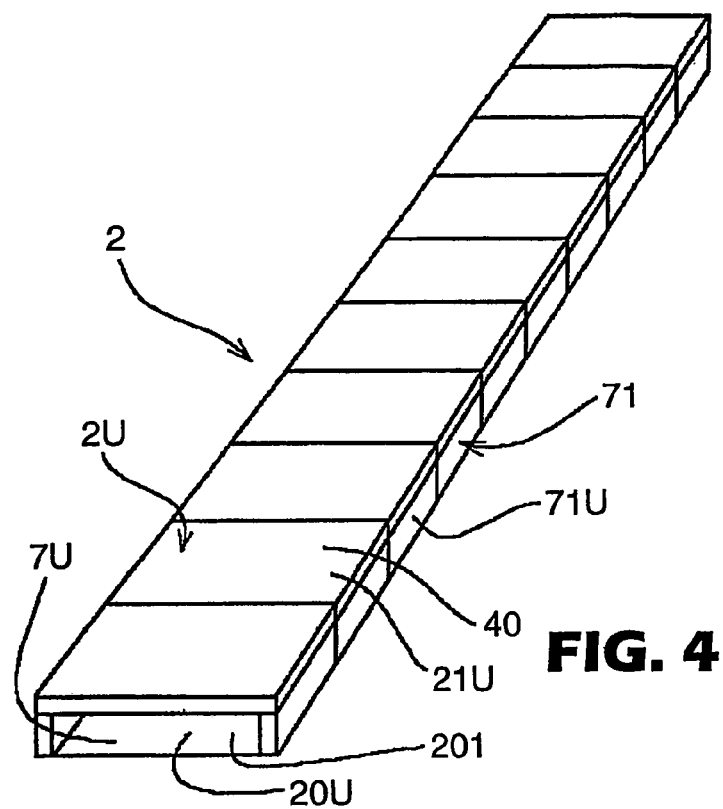
FIG. 4 is an oblique view showing an example of a body formed of an assembly of a plurality of body units.

The body may be formed of an assembly of body units, as shown in FIG. 4. Each of body units (2U) shown in the figure includes one block light-transmitting member (21U) and is almost in the shape of a rectangular parallelepiped. The body (2) is formed of an assembly in which a plurality of body units (2U) is interconnected in the longitudinal direction of the body (2). Each of the body units (2U) has a block space (20U) formed therein. These block spaces (20U) are optically connected to form the light guiding space of the body (2). In the example shown in the figure, the body units (2U) are interconnected through openings in the longitudinal direction of the body (2). Therefore, the block spaces (20U) form one space which is longer in the longitudinal direction. This space may be used as the light guiding space. The body units (2U) may have light-transmitting side walls perpendicular to the surface of the block light-transmitting member (21U). The body units (2U) may be connected through these perpendicular side walls to form the body (2).

As shown in the figure, the block space of the body unit located on one edge of the body (2) in the longitudinal direction has an opening which can be directly connected to the outside. This opening functions as the incident plane (201) of the light guiding space of the body (2). The sides of the light guiding space of the body (2) are preferably covered with an opaque member so that the light does not leak to the outside from the sides other than the incident plane (201) and the emission plane covered with the light-transmitting member. Therefore, each of the body units (2U) has such an opaque member.

The sides perpendicular to the emission plane extending in the longitudinal direction of the light guiding space of the body (2) are covered with a perpendicular side plate (71) formed of an opaque member. Therefore, each of the body units (2U) includes a block perpendicular side plate (71U). The edges of the block perpendicular side plates (71U) are connected to one another, whereby the perpendicular side plate (71) is formed. The block perpendicular side plate (71U) is preferably a reflective plate formed of a specular reflective material.

The perpendicular sides facing the incident plane in the longitudinal direction of the light guiding space of the body (2) are also covered with an opaque member. Therefore, the body unit located on the other edge of the body (2) in the longitudinal direction has such an opaque member. Specifically, in the body unit located on the other edge of the body, the side present between the adjoining block space of the body unit is allowed to remain as an opening, and the other side is covered with the opaque member. The opaque member is preferably a reflective plate (72) formed of a specular reflective material in the same manner as in the example shown in FIG. 1. It is preferable that the reflective plate be slightly tilted so that the reflecting surface faces the light-transmitting member (21), as shown in the figure. This is advantageous for increasing the brightness of the light-emitting surface.

The bottom of the body (2) parallel to the emission plane is preferably covered with a specular reflective material. Therefore, each of the body units (2U) includes a block specular reflective material (7U). The block specular reflective materials (7U) are connected to one another to form a specular reflective material which covers the entire area of the bottom.

A block light-transmitting member (21U) of the body unit (2U) is formed of a block light-transmitting plate (40) and one divided piece of prism sheet disposed on each of the block light-transmitting plates. Specifically, the prism sheet which covers the entire area of the light guiding space of the body is formed of a plurality of divided pieces of prism sheets. In this case, the flat surface of the divided piece of prism sheet (5) is attached to the back face of the block light-transmitting plate (40) so that the prism surface faces the light guiding space, as shown in FIG. 3. The prism sheet is preferably attached to the light-transmitting plate through a translucent adhesive.

The body units (2U) are completed by bonding the block light-transmitting members for the emission plane and the perpendicular side plates on the edges to form a unit precursor in almost the shape of the letter "U" in cross section, and bonding the specular reflective material which covers the bottom to the perpendicular side plate. In the case where it is desired to reduce the weight and to increase the mechanical strength of the perpendicular side plate, the perpendicular side plate may be formed of a comparatively thick plastic plate. In the case of providing reflectiveness to the perpendicular side plate, a specular reflective material may be attached to the plastic plate. The thickness of the plastic plate is not limited. The thickness may be appropriately determined depending upon the application of the surface light-emitting device. The thickness of the plastic plate is generally 3–20 mm.

Since the body unit is in the shape of a hollow tube, the body unit can be easily handled due to the light weight. Therefore, use of the body units facilitates the manufacture of the body. Specifically, a necessary number of body units is carried to the site at which the surface light-emitting device is installed. The body units are arranged so that the edges of the block light-transmitting members are attached. The borderlines between the block light-transmitting members are sealed and a plurality of body units is connected. The body is thus completed.

A second block light-transmitting plate (surface light-transmitting plate) may be disposed on the block light-transmitting plate of the body thus completed. In the case of incorporating the body into the floor of the building, if the block light-transmitting plate of the body is exposed, the surface of the block light-transmitting plate may be damaged due to human traffic, hand trucks, or the like. However, the surface light-transmitting plate may be used to protect the block light-transmitting plate of the body. Specifically, the block light-transmitting plate of the body can be used if the surface of the surface light-transmitting plate is damaged. Therefore, it suffices that only the damaged surface light-transmitting plate be replaced. In this case, the surface light-transmitting plate is preferably positioned on the block light-transmitting plate without being bonded to the surface light-transmitting plate.

Figure 5:
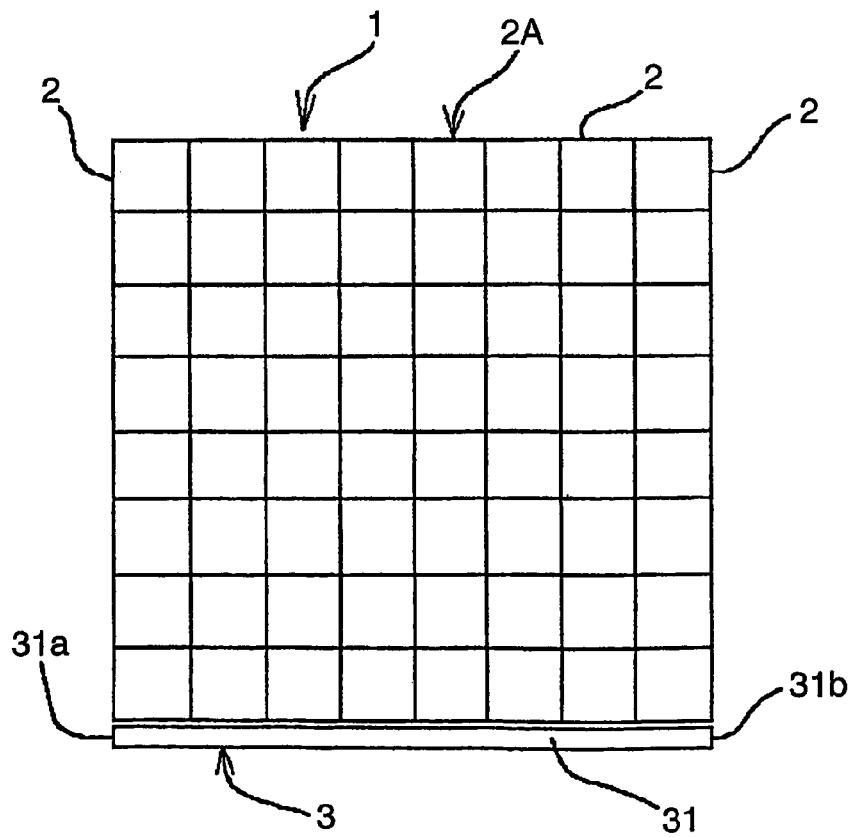
FIG. 5 is a view for describing an example of the assembly of the body units.

A surface light-emitting device may be formed by using only one body. A surface light-emitting device having a larger light-emitting area may be formed by utilizing two or more bodies. For example, an assembly (2A) of the bodies may be formed by arranging a plurality of bodies (2) so that the bodies are parallel to one another in the longitudinal direction, as shown in FIG. 5. In this case, the sides perpendicular to the emission plane extending in the longitudinal direction between the bodies (2) attached to one another may be covered with an opaque perpendicular side plate. However, it is preferable that the perpendicular sides be covered with a perpendicular side plate formed of a transparent material. This enables the light guiding spaces of the bodies (2) to be optically connected, whereby a large light guiding space consisting of these light guiding spaces can be formed. If the assembly (2A) of the bodies has such a light guiding space, light introduced into the light guiding space of each body can be efficiently utilized, whereby the brightness of the light-emitting surface can be effectively increased.

In the case of using the assembly (2A) of the bodies, light sources may be disposed for each body (2) or one light source (3) may be used as shown in FIG. 5. In this case, since the length of the light source is comparatively increased, it is preferable to use a line light source including a hollow light tube (31) and a luminescent light source (not shown) which supplies light to the hollow light tube (31) as disclosed in the above publications. The luminescent light source is generally disposed so that the light is supplied to the tube (31) from either one edge (31a) or the other edge (31b) of the hollow light tube (31) in the longitudinal direction. Two luminescent light sources may be disposed so that the light is supplied from both edges of the hollow light tube (31) in the longitudinal direction.

Although not shown in FIG. 5, it is preferable to dispose a reflective plate to cover the light source (3). As the reflective plate for the light source, a reflective plate having a reflection area in the shape of the letter U in cross section is preferable in the same manner as in the example shown in FIG. 1. Among them, a parabolic mirror is particularly preferable.

The surface light-emitting device (1) manufactured in the above manner is incorporated into the partition of the floor of the building or the like and used as a planar illumination device, for example. In the case of using the surface light-emitting device as the planar illumination device, the body may be formed without using the body units. In the case of integrating the surface light-emitting device into the floor of the building, the framework of the body (2) may be formed using a frame member (8) shown in FIG. 6.

The frame member (8) consists of a rail portion (81) which supports the light-transmitting member (21), and a support (82) which supports the rail portion (81) at a specific distance from an installation plane (80). The rail portion (81) and the support (82) are generally formed of a metal such as iron or stainless steel.

Two rail portions (81) are generally disposed to support one light-transmitting member (21). The rail portions (81) are arranged in parallel on a horizontal plane at a specific interval. The horizontal plane is parallel to the emission plane (202) of the light guiding space (20) of the body. The rail portions (81) are continuous along the longitudinal direction of the light guiding space (20). Specifically, two parallel rail portions (81) form an opening extending along the longitudinal direction of the light guiding space.

A plurality of supports (82) is disposed at a specific interval along the longitudinal direction of the light guiding space (20). Therefore, openings partitioned by a plurality of supports (82) are formed in the perpendicular sides extending along the longitudinal direction of the light guiding space. These openings are generally covered with an opaque member such as a specular reflective material. In the case of using a plurality of bodies (2) closely arranged in parallel in the longitudinal direction of the light guiding space as shown in the figure, an opening may be allowed to remain on the perpendicular side between the adjoining bodies. A specular reflective material (7) is preferably disposed on the bottom parallel to the emission plane (202) of the light guiding space (20) of the body in the same manner as in the above example.

The light-transmitting member (21) is preferably formed of an assembly of block light-transmitting members, each of which consists of the block light-transmitting plate (40) and a divided piece of the prism sheet (5) attached to the back face of the block light-transmitting plate (40). This facilitates manufacture of the body (2). The block light-transmitting member is comparatively light, whereby transportation and handling are easy. The rail portions and the supports, which are constituent parts of the frame member (8), may be carried separately and assembled at the site. Specifically, these constituent parts may be carried to the site, and the frame members (8) are assembled on the installation plane (80) at the site. The block light-transmitting members are arranged on the rail portions (81) of the frame members along the longitudinal direction of the rail portions (81). The body can be completed in this manner. The specular reflective material on the bottom may be disposed before arranging the block light-transmitting members. The edges of the block light-transmitting members are attached to one another. The borderlines between the block light-transmitting members are sealed. The opaque member which covers the perpendicular side is then disposed.

Prism Sheet

The prism sheet is a sheet of which one of the main surfaces is a prism surface and the other main surface is a flat surface. The prism sheet is generally formed of a resin such as an acrylic resin, polyester resin, or polycarbonate resin.

The shape of the prisms of the prism surface is generally triangular. However, the shape of the prisms is not limited thereto. The prism may be in the shape of a semicircle or an arc in cross section, or may have a shape in which the top of a triangle is rounded. A plurality of prisms of the prism surface may have different shapes and/or sizes. The prism surface may be disposed so as to face the diffuse transmission films or a plurality of prism sheets may be disposed in combination As shown in FIG. 3, it is preferable that the prism surface of the prism sheet face the light guiding space, and a plurality of parallel prisms be disposed on the prism surface so as to intersect the longitudinal direction of the light guiding space almost at right angles. This ensures that the amount of light leaking to the outside from the area close to the light source can be controlled appropriately, whereby an excessive increase in the brightness in this area can be prevented. Therefore, a decrease in the brightness in the area at a distance from the light source can be effectively prevented, whereby the uniformity of the light-emitting surface can be increased. In this case, the parallel prisms are preferably triangular prisms of which the apical angle is in the range of 60–80°. As specific examples of commercially available products of such a prism sheet, "TRAF" (trademark: prism apical angle=70°) manufactured by Sumitomo 3M Limited and the like can be given.

Light Source

As the line light source, light sources used in conventional surface light-emitting devices may be used. For example, a line light source including a side emitting type light fiber or a hollow light tube as an optical transmitter may be used. In this case, the optical transmitter is a portion which introduces light into the light guiding space. The luminescent light source, which is the light-emitting section, may be disposed separately from the surface light-emitting device. The optical transmitter is disposed in parallel to the incident plane and the light-emitting surface.

In the case of forming the optical transmitter using the hollow light tube, the diameter (dimensions in the direction of the diameter of the cross section which intersects the longitudinal direction at right angles) can be comparatively increased. Therefore, the amount of light incident on the light guiding space can be easily increased. The hollow light tube is generally formed by cylindrically rolling up the prism sheet. In this case, it is preferable that the prism sheet be rolled up so that the prism surface faces the outside and the longitudinal direction of the prisms of the prism surface is not parallel to the circumferential direction of the tube which intersects the longitudinal direction. The angle formed by the longitudinal direction of the prisms and the circumferential direction of the tube is generally 45–90°. The apical angle of the prisms of the prism surface is generally in the range of 80–100°.

As the luminescent light source, a high intensity lamp such as a xenon lamp, halogen lamp, metal halide lamp, or flash lamp may be used. The power consumption of the lamp is generally 0.1–5 kW. The lamp is generally placed in a container. A reflective plate for the lamp is installed in the container. Light supplied from the light source may be either white light or colored light. For example, light emitted from the lamp may be supplied as colored light through a color filter.

EXAMPLES

A surface light-emitting device having a structure shown in FIGS. 1 and 2 was formed. The surface light-emitting device was disposed on the surface of the floor and caused to emit light. A body was provided with a light-transmitting plate formed by arranging seven pieces of block light-transmitting members including a block light-transmitting plate having a planar area of 800×800 mm as shown in the figure. The distance from the surface of the light-transmitting plate to the installation surface (bottom of the light guiding space) was 500 mm. Therefore, the device of this example had a light-emitting surface with an area of 800 mm×5.6 m.

Figure 6:
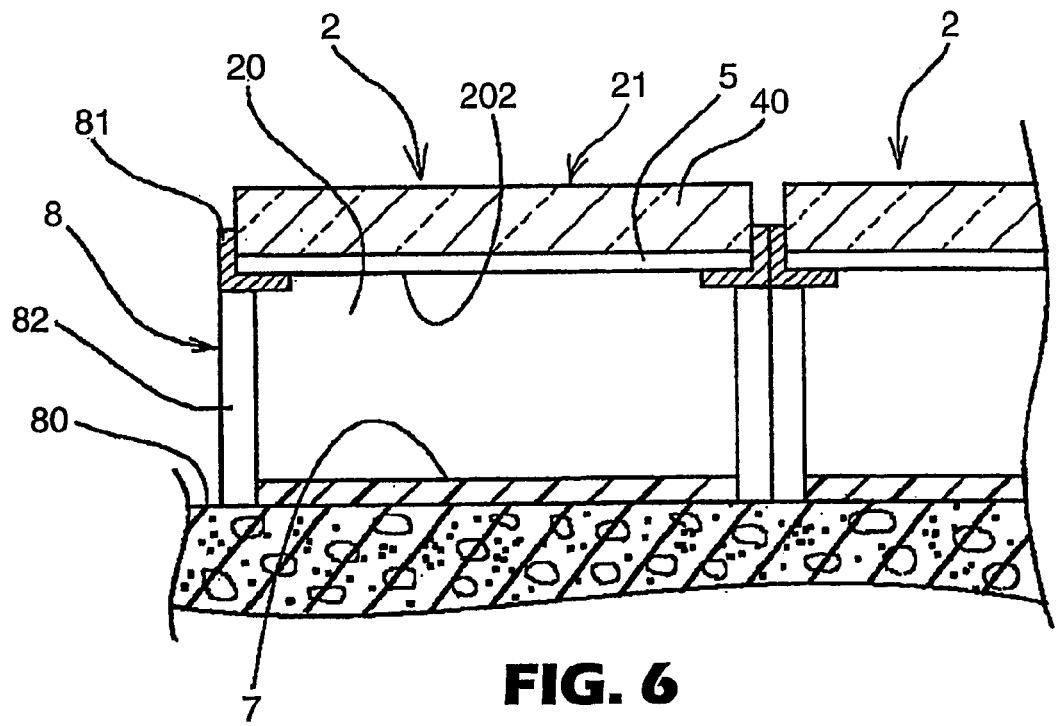
FIG. 6 is a cross-sectional view showing an example in which the surface light-emitting device of the present invention is incorporated into the floor of a building.

The body was formed by using a framework of the body formed using frame members made of a metal shown in FIG. 6. The light-transmitting plate was formed of a plurality of block light-transmitting plates. The block light-transmitting plate was formed of reinforced glass having a thickness of 10 mm. The above commercially available prism sheet having a prism apical angle of 70° was bonded to the back face of the block light-transmitting plate using an acrylic adhesive to obtain block light-transmitting members. The flat surface of the prism sheet was attached to the back face of the block light-transmitting plate. Seven pieces of block light-transmitting members were arranged on the framework of the body, and the borderlines between the adjoining block light-transmitting plates were sealed using a sealing agent.

A specular reflective material disposed on the bottom of the light guiding space was a specular reflection film having a visible light reflectance of 95% (trademark: Silverlux, manufactured by Sumitomo 3M Limited). A reflective plate for covering the side facing the incident plane and an opaque member for covering the perpendicular side extending in the longitudinal direction of the light guiding space were also formed using this specular reflection film.

A diffusion filter consisting of three pieces of diffuse transmission film (visible light transmittance=40%) was attached to three pieces of light-transmitting plate close to the light source using an acrylic adhesive, as shown in FIGS. 1 and 2. Therefore, three pieces of film were attached to the light-transmitting plate close to the light source, two pieces of film were attached to the second light-transmitting plate from the light source, and one piece of film was attached to the third light-transmitting plate from the light source. No diffuse transmission film was disposed on the light-emitting surfaces of the fourth to seventh light-transmitting plates from the light source.

A line light source including a light tube and a luminescent light source in combination was used as the light source. As the luminescent light source, a high intensity metal halide lamp (1 kW) was used. The light tube was formed using a prism sheet manufactured by Sumitomo 3M Limited (trademark: OLF, prism apical angle=90°). This prism sheet was rolled up cylindrically so that the prism surface faced the outside and the cross-sectional diameter of the inner space was 250 mm. A reflective plate for covering the light source was formed by rolling up the above specular reflection film having a visible light reflectance of 95%.

Figure 7:
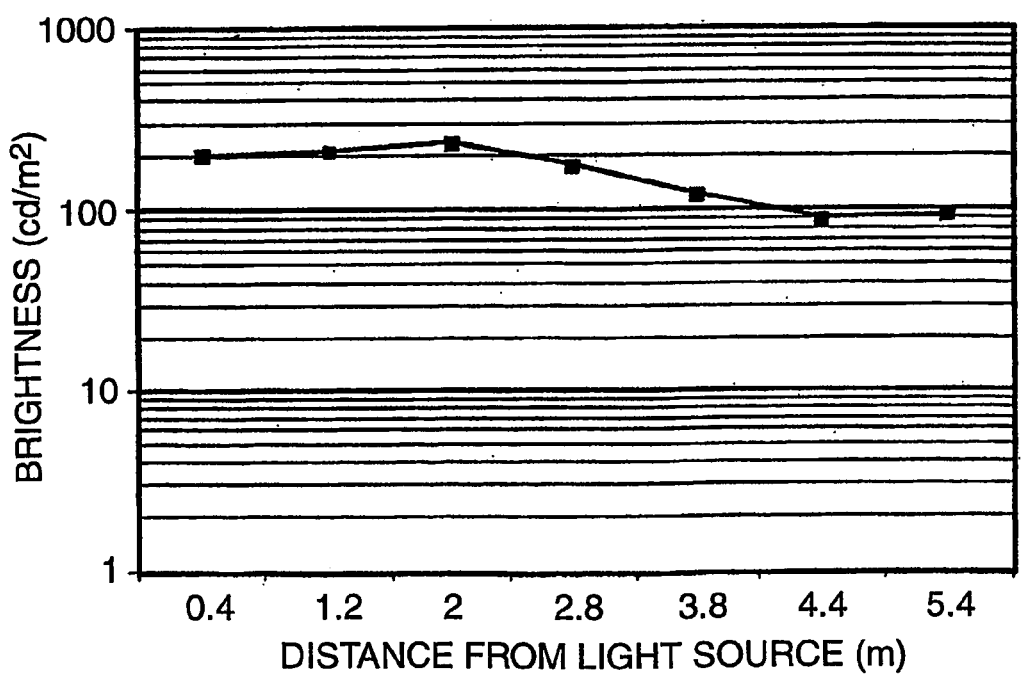
FIG. 7 is a graph showing measurement results for brightness of the surface light-emitting device manufactured in the example.

When emitting light from the surface light-emitting device of this example formed in this manner, it was confirmed that light was emitted uniformly. The brightness measured at a distance of 0.4 m from the light source in the longitudinal direction was 200 cd/m$^2$, and brightness measured at a distance of 5.4 m from the light source was 95 cd/m$^2$. The brightness ratio of these measurement points was 2. The brightness ratio of the brightest point to the darkest point was 2.5. The brightness was measured using an illuminance meter "T-1H" manufactured by Minolta Co., Ltd., at a distance of 30 cm from the light-emitting surface. The measurement results for brightness are shown in FIG. 7.

In the case where no diffusion filter was disposed, brightness at the brightest point near the light source was increased to 310 cd/m$^2$, and brightness at the darkest point at a distance from the light source was decreased to 55 cd/m$^2$. The brightness ratio of these points was 5.6, whereby sufficient uniformity of emission of light could not be obtained.

As is clear from the above results, according to the present invention, a surface light-emitting device which emits light uniformly over the entire area of the large light-emitting surface can be easily manufactured. Since it suffices that the length of the light source be the same as the width of the light guiding space, light can be emitted with high brightness without the need for a large amount of electric power.

What is claimed is:

1. A surface light-emitting device comprising:
   a body outlining a light guiding space in the shape of a rectangular parallelepiped having a specific length, width, and height, and
   a light source which is arranged outside the body to supply light to the light guiding space,
   wherein light supplied from the light source through an incident plane formed of at least one of the sides of the light guiding space can be emitted to the outside through an emission plane formed of the side which intersects the incident plane at right angles,
   wherein the body includes a light-transmitting member arranged to cover the emission plane, the light-transmitting member includes a light-transmitting plate having a back face facing the light guiding space and a surface opposing the back face, and a prism sheet arranged on the back face of the light-transmitting plate, the surface of the light-transmitting plate is a light-emitting surface,
   wherein the incident plane is one of the opposing sides of the light guiding space in the longitudinal direction, the light-transmitting plate includes a diffusion filter covering a specific area of the surface of the light-transmitting plate near the light source, the remaining area of the surface of the light-transmitting plate at a distance from the light source is not covered with the diffusion filter, and
   wherein the diffusion filter is formed of a laminate in which a plurality of diffuse transmission films is layered, and the number of diffuse transmission film layers is greatest in the area close to the light source and gradually decreases as the distance from the light source increases so that light transmittance is increased as the distance from the light source increases due to a decrease in diffusion of light.

2. The surface light-emitting device according to claim 1, wherein the light-transmitting plate includes a plurality of block light-transmitting plates which are arranged horizontally along the longitudinal direction of the light guiding space so that the edges of the block light-transmitting plates are in contact with one another, the diffusion filter substantially covers the entire area of the surfaces of a specific number of the block light-transmitting plates present near the light source, but does not cover the surfaces of the remaining block light-transmitting plates present at a distance from the light source, and the number of diffuse transmission film layers is greatest on the block light-transmitting plate close to the light source and gradually decreases as the distance from the light source increases.

3. The surface light-emitting device according to claim 2, wherein the borderline between the block light-transmitting plates corresponds to the edge of the diffuse transmission film.

4. The surface light-emitting device according to claim 2, wherein the light-transmitting member is formed of an assembly of block light-transmitting members, each of which includes the block light-transmitting plate, the prism sheet is formed of an assembly of divided pieces of prism sheets, and the divided pieces of the prism sheets are disposed on the block light-transmitting plates to form the block light-transmitting members.

5. The surface light-emitting device according to claim 4, wherein the body is formed of an assembly of body units, each of which includes one of the block light-transmitting members and is in almost the shape of a rectangular parallelepiped, each of the body units has a block space formed therein, and a plurality of block spaces is optically connected to form the light guiding space.

* * * * *